United States Patent [19]
Hofmann

[11] 4,283,119
[45] Aug. 11, 1981

[54] METHOD OF PRODUCING SPACING ELEMENTS FOR ELECTRO-OPTICAL DISPLAY DEVICES AND SUCH DISPLAY DEVICES

[75] Inventor: Horst Hofmann, Munich, Fed. Rep. of Germany

[73] Assignee: Siemens Aktiengesellschaft, Berlin & Munich, Fed. Rep. of Germany

[21] Appl. No.: 74,991

[22] Filed: Sep. 13, 1979

[30] Foreign Application Priority Data

Sep. 22, 1978 [DE] Fed. Rep. of Germany ....... 2841435

[51] Int. Cl.³ .............................................. G02F 1/133
[52] U.S. Cl. .................................. 350/344; 140/71 R
[58] Field of Search .......................................... 350/344

[56] References Cited
U.S. PATENT DOCUMENTS

| | | | |
|---|---|---|---|
| 3,902,789 | 9/1975 | Gerritsma et al. ................... | 350/344 |
| 3,978,580 | 9/1976 | Leupp et al. ..................... | 350/344 X |
| 3,995,941 | 12/1976 | Nagahara et al. ................ | 350/344 X |
| 4,158,485 | 6/1979 | Mueller et al. ................... | 350/344 X |

*Primary Examiner*—Edward S. Bauer
*Attorney, Agent, or Firm*—Hill, Van Santen, Steadman, Chiara & Simpson

[57] ABSTRACT

Fiber-shaped metal-containing spacing elements having a well-defined diameter of less than 100 μm for spacing two plates in an indicia display device, such as a liquid crystal cell, are produced by providing a wire composed of a metal selected from the fourth to sixth adjacent groups of the Periodic Chart of the Atoms, converting the peripheral surface layer of such wire into a brittle metallic compound and breaking-up the so-treated wire into desired size individual spacing elements. By utilizing metal wires, an exact diameter dimension can be attained and by chemical conversion of the wire surface, the produced metal wire loses its ductility and can be easily broken-up into desired size elements. Spacing elements of the invention are useful in all types of indicia display devices particularly in multiplex liquid crystal display devices.

9 Claims, 1 Drawing Figure

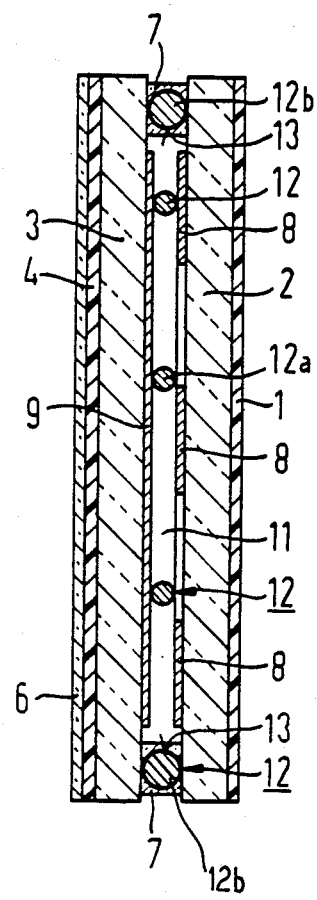

METHOD OF PRODUCING SPACING ELEMENTS FOR ELECTRO-OPTICAL DISPLAY DEVICES AND SUCH DISPLAY DEVICES

BACKGROUND OF THE INVENTION

1. Field of the Invention

The invention relates to indicia display devices and somewhat more particularly to a method of producing spacing elements for indicia display devices such as liquid crystal cells and to display devices utilizing such spacing elements.

2. Prior Art

Electro-optical display devices, such as liquid crystal cells are known, for example see U.S. Pat. No. 3,995,941 (which corresponds to German Offenlegungsschrift No. 2,254,940). In a series of such electro-optical devices, it is important to insure that the two carrier plates of a device maintain a spacing relative to one another which is as exact as possible. This requirement is especially critical for liquid crystal display devices (FKAs) because important liquid crystal indication characteristic data, such as for example, the switching behavior or the value of the threshhold voltage for an FKA is extremely dependant upon the thickness of the liquid crystal layer. Accordingly, spacing tolerances are particularly low when FKAs are operated in a multiplex method and/or with a so-called "bistability effect". In certain extreme present-day cases, spacing tolerances of about ±5%, thus fractions of a $\mu$m are required.

In order to achieve such spacing precision, workers in the art have proposed numerous and widely diverse solutions. For example, in the earlier cited U.S. Pat. No. 3,995,941 it is proposed to include relatively small sized particles between carrier plates of an FKA. Such particles may comprise glass fibers, metal fibers, whisker crystals or the like. It is suggested that glass particles or fibers are preferred for the spacing function because they are thermally stable in an FKA environment and can readily be produced with a required diameter dimension which is exact to about ±10%. However, metal fibers would be even more accurate as to size because suitably thick metal filaments having thickness fluctuations of only about ±5% are actually available. Nevertheless, metallic spacing particles have, up until now, been unsuitable for use in FKAs, primarily because their thermal coefficient of expansion deviates too much from that of the other elements in an FKA and even more importantly because the ductility of a metal wire or filament prevents its desired reduction in size via an expenditure which is justifiable. Further, metal particles are electrically conductive and, for that reason alone, are only useful in a few special cases.

SUMMARY OF THE INVENTION

The invention provides a method of producing spacing elements having relatively exact diameter dimensions of less than about 100 $\mu$m useful in spacing two plates from one another, as in an electro-optical indicia display device, i.e. an FKA. The invention also provides improved electro-optical display devices wherein the plates thereof are spaced by a relatively constant diameter fibers or particles composed of a brittle metallic compound.

In accordance with the principles of the invention, an initially pure metal wire of a select, relatively small diameter is produced from a transition metal selected from the group consisting of the fourth to the sixth adjacent groups of the Periodic Chart of Atoms, the peripheral surface layer of such wire is then converted into a brittle compound and the resultant wire is then broken-up into individual elements of a desired size which have a relatively constant diameter dimension.

In accordance with the principles of the invention, the brittle compound formed on the peripheral surface layer of the metal wire is a metallic carbide, a metallic boride, a metallic nitride or a metallic silicide, such as a molybdenum carbide, a titanium carbide, a tantalum carbide, or a tungsten carbide. In certain embodiments of the invention, the individual particles attained after breaking-up of the brittle compound-coated metal wire are re-converted into the initial metal state.

In accordance with the principles of the invention, improved indicia display devices, such as liquid crystal cells, are comprised of two planar plates spaced uniformly apart via spacing elements, such as fibers or particles, having a thickness ranging between about 4 and 30 $\mu$m and having a length of about 50 to 100 $\mu$m. In preferred embodiments of the invention, the brittle layer about a metal fiber has a thickness of less than about 3 $\mu$m and preferably less than about 2 $\mu$m. In certain embodiments of the invention, the display device includes a frame means sealing the plates to one another and the spacing elements of the invention are embedded within such frame means in an amount equal to about 0.05 to 0.3% of the weight of the frame mass and more preferably in an amount equal to about 0.1 to 0.2 wt.%. The spacing elements of the invention may be located in the interior of the chamber defined by the plates or in the frame means of a display device and/or they may be located within the interior of such chamber and be embedded in a mass which binds the two plates to one another.

By converting a peripheral surface layer of a metallic wire into a brittle compound in accordance with the principles of the invention, the overall wire structure, i.e. the brittle surface layer and the metallic core, become brittle and can be reduced in size in a conventional and economical manner, as by a ball mill or the like. This phenomena apparently is due to the fact that the material (C, B, N or Si) which forms a chemical compound on the wire surface during the conversion process, also diffuses into the interior of the wire and renders the structure thereof brittle. This brittlization effect occurs even when only about 20% of a wire thickness is converted. Such brittlization process has no apparent effect on the thickness or diameter of the resultant fibers or particles, as can be confirmed by conventional measurements. Accordingly, the relatively narrow cross-section (diameter) tolerances of a metallic wire are thus completely maintained. On the other hand, two other important parameters are changed: the thermal coefficient of expansion, $\chi$, and the electrical conductivity, $\rho$. The $\chi$ value of the brittle phase is so low that in encountering temperature cycles which are to be expected in indicia display devices, both during the production thereof and in normal operation thereof, no interferences which are worthy of mention occur. The $\rho$ value depends on the thickness of the chemically converted fiber "jacket" and can thus assume any desired value between "semiconducting" and "insulating". However, it is also possible to convert the spacing elements into good electrical conductors: to achieve this, it is only necessary to re-convert the fiber jacket into its initial metallic state. This re-conversion is particularly feasible when a metallic carbide comprises the fiber jacket. Such re-conversion does not effect the fiber dimensions.

BRIEF DESCRIPTION OF THE DRAWINGS

The FIGURE is an elevated, somewhat schematic, cross-sectional view of an exemplary liquid crystal cell constructed in accordance with the principles of the invention.

DESCRIPTION OF THE PREFERRED EMBODIMENTS

An exemplary FKA is illustrated in the drawing and comprises, individually, a frontal linear polarizer 1, a frontal carrier plate 2, a posterior carrier plate 3, a posterior linear polarizer 4 which is crossed relative to the frontal linear polarizer and the reflector 6. The two carrier plates 2 and 3 are connected in a hermetically-tight manner to one another via a surrounding frame means 7 which bears upon the interior plate surfaces which face one another and respectively support electrically conductive coatings (a segmented frontal electrode comprised of segmented electrodes 8 and a posterior electrode comprised of continuous electrodes 9). The chamber defined between the plates 2 and 3 and the frame means 7 is filled with a liquid crystal layer 11. In this exemplary embodiment, the liquid crystal display functions in accordance with the principles of a so-called "twisted nematic cell", further details of which may be obtained from German Auslegeschrift No. 21 58 563.

The plates 2 and 3 are spaced from one another via spacing elements 12, which in the embodiment illustrated are positioned both within the frame means 7 and within the liquid crystal layer chamber. As illustrated, the spacing element 12 within the liquid crystal layer chamber comprise metallic elements 12a whereas the spacing elements embedded in the frame means are comprised of an outer layer 13 composed of a brittle metallic compound and a metallic core 12b composed of a metal. Of course, the spacing element within the liquid crystal layer chamber and within the frame means may be the same. Each of such spacing elements comprise a fiber of, for example, molybdenum carbide and each fiber has a length of about 50 to 100 μm and a diameter of about 8±0.5 μm. In embodiments where the spacing elements are embedded within the frame means 7, such elements are present in an amount equal to about 0.05 to 0.3 weight % and more preferably about 0.1 to 0.2 weight % relative to the weight of the frame means. Such a concentration of spacing elements assures that the statistically distributed spacing elements are not spaced too far apart from one another to permit any sagging or the like between the layers and yet do not lie on top of one another.

With the foregoing general discussion in mind, a detailed exemplary embodiment of a method of producing spacing elements in accordance with the principles of the invention is provided which will illustrate to those skilled in the art the manner in which the invention is carried out. However, this exemplary embodiment is not to be construed as limiting the scope of the invention in any way.

EXAMPLE

A molybdenum fiber or wire is produced in a conventional manner so as to have a select relatively constant diameter with a thickness fluctuation of about ±5% of the select diameter dimension. The peripheral surface layer of such wire is then converted into a brittle molybdenum carbide layer by, for example, carbonizing the wire at about 1100° C. in a suitable reaction zone. A gas is fed into a reaction zone, such as the furnace means, from a suitable source for the carbonization reaction. The gas is comprised of, for example 90% $N_2$/10% $H_2$ at 20° C. which is passed through a wash bottle or the like filled with a carbon source, i.e. n-heptane, at a flow velocity of about 20 to 22 liters per hour. Under such reaction conditions, the molybdenum wire attains a peripheral surface layer composed of $Mo_2C$ which has a thickness of about 1.5 μm. After the carbonization process is completed, the so-coated wire is reduced in size as desired, for example in a mill or a mortar. The resultant particles have relatively constant diameter dimensions and are useful as spacing elements in indicia display devices, such as in liquid crystal cells. Of course, similar particles can be produced from select metals in the fourth through sixth adjacent group of the Periodic Chart of the Atoms by passing a wire of such metal through a heated reaction zone while substantially simultaneously feeding a gas containing a material selected from the group consisting of carbon, boron, nitrogen or silicon so that a brittle metallic compound is formed on the peripheral surface of the wire.

Any dust which may be generated during the grinding process (wire size reduction process) is extraordinarily fine and insofar as can now be determined, it is not noticeably detrimental in any way in indicia display devices. Further, in instances where the spacing elements are admixed with a glass solder mass (used to form a frame means of a FKA), then any dust present fuses without residue into the glass solder during the final melting of such solder. Likewise, in instances where an organic adhesive material is admixed with the spacing elements, any presence of dust is immaterial because as a rule, such adhesive materials contain fine particle filler materials. Nevertheless, in instances where the spacing elements are distributed within a liquid crystal chamber without an embedding medium, individual dust particles may cause local orientation disturbances in a liquid crystal layer. In such instances, one can switch from conventional grinding container materials, such as agate or aluminum oxide to dust-free abrasive materials such as sintered, poreless, relatively pure tetraboric-borocarbide.

The invention is not limited to the exemplary embodiment described above. Thus, beside FKAs the invention is also useful with other relatively flat or shallow display devices, as for example, electro-optical display devices using the electrochromic effect. Further, the principles of the invention are also useful in providing spacing elements between any two substrates which must be spaced apart a relatively constant distance. It will, of course, be understood that in such instances, the suitability of the spacing elements relative to the environment of use, their specific dimensions and, where applicable, their weight proportions, are to be adapted to a concrete application and thus can vary within wider limits than set forth hereinabove.

As is apparent from the foregoing specification, the present invention is susceptible of being embodied with various alterations and modifications which may differ particularly from those that have been described in the preceding specification and description. For this reason it is to be fully understood that all the foregoing is intended to be merely illustrative and is not to be construed or interpreted as being restrictive or otherwise limiting of the present invention, excepting as it is set forth and defined in the here-to appended claims.

I claim as my invention:

1. In an indicia display device such as a liquid crystal cell having two plates spaced from one another via at least two spacing elements, the improvement comprising wherein said spacing elements are composed of a metal core enveloped by a layer of a brittle metallic compound, said metal core and layer of brittle metallic compound having identical metal atoms which are selected from the fourth through the sixth adjacent groups of the Periodic Chart of the Atoms and said compound being selected from the group consisting of a carbide, a boride, a nitride, and a silicide; said layer of brittle metallic compound having a maximum thickness of about 3 μm.

2. In an indicia display device as defined in claim 1 wherein said layer of a brittle metallic compound has a maximum thickness of about 2 μm.

3. In an indicia display device as defined in claim 1 wherein said spacing elements have a length in the range of about 50 to 100 μm and a diameter in the range of about 4 to 30 μm.

4. In an indicia display devices as defined in claim 1 wherein said device includes a frame means binding said plates to one another and said spacing elements are embedded within said frame means, said spacing elements being present in an amount ranging between about 0.05 to 0.3 weight % relative to the weight of said frame means.

5. In an indicia display device as defined in claim 4 wherein said spacing elements are present in an amount ranging between about 0.1 to 0.2 weight % relative to the weight of said frame means.

6. In an indicia display device as defined in claim 4 wherein said spacing elements are positioned within a chamber defined by said plates and said frame means.

7. In an indicia display device as defined in claim 4 wherein said spacing elements positioned within said chamber are embedded within a mass binding said plates to one another.

8. An indicia display device as defined in claim 1 wherein said spacing elements are composed of a molybdenum core enveloped by a layer of molybdenum carbide.

9. In an indicia display device as claimed in claim 6 wherein the metal core is selected from the group consisting of Mo, Ti, Ta and W and enveloped by a corresponding metallic carbide compound.

* * * * *